(12) United States Patent
Baek

(10) Patent No.: US 8,983,441 B2
(45) Date of Patent: Mar. 17, 2015

(54) APPARATUS AND METHOD FOR PORTABLE TERMINAL HAVING DUAL SUBSCRIBER IDENTITY MODULE CARD

(71) Applicant: Samsung Electronics Co. Ltd., Suwon-si (KR)

(72) Inventor: In-Ho Baek, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 13/727,179

(22) Filed: Dec. 26, 2012

(65) Prior Publication Data

US 2013/0217373 A1  Aug. 22, 2013

(30) Foreign Application Priority Data

Feb. 20, 2012 (KR) .................. 10-2012-0016940

(51) Int. Cl.
  *H04M 3/42* (2006.01)
  *H04W 4/16* (2009.01)
  *H04M 1/725* (2006.01)

(52) U.S. Cl.
  CPC ............ *H04W 4/16* (2013.01); *H04M 1/72519* (2013.01); *H04M 2250/22* (2013.01)

USPC ................... 455/417; 455/551; 455/558

(58) Field of Classification Search
  None
  See application file for complete search history.

(56) References Cited

U.S. PATENT DOCUMENTS

| 2006/0234693 | A1 | 10/2006 | Isidore et al. |
| 2010/0009716 | A1 | 1/2010 | Lee et al. |
| 2010/0255880 | A1 | 10/2010 | Huang et al. |
| 2011/0081951 | A1 | 4/2011 | Hwang |

FOREIGN PATENT DOCUMENTS

| EP | 2 043 395 A1 | 4/2009 |
| KR | 10-2011-0008441 A | 1/2011 |
| WO | 2006-085107 A1 | 8/2006 |
| WO | 2007-108811 A2 | 9/2007 |
| WO | 2010-140781 A2 | 12/2010 |

*Primary Examiner* — Suhail Khan
(74) *Attorney, Agent, or Firm* — Jefferson IP Law, LLP

(57) ABSTRACT

A method of operating a portable terminal having a dual Subscriber Identity Module (SIM) card is provided. The method includes displaying a message regarding whether to set a dual SIM active function, selecting an area included in the message, and confirming a setting of the dual SIM active function upon the selection of the area included in the message.

23 Claims, 7 Drawing Sheets

APPARATUS AND METHOD FOR PORTABLE TERMINAL HAVING DUAL SUBSCRIBER IDENTITY MODULE CARD

PRIORITY

This application claims the benefit under 35 U.S.C. §119(a) of a Korean patent application filed on Feb. 20, 2012 in the Korean Intellectual Property Office and assigned Serial No. 10-2012-0016940, the entire disclosure of which is hereby incorporated by reference.

BACKGROUND OF THE INVENTION

1. Field of the Invention

The present invention relates to an apparatus and method for a portable terminal. More particularly, the present invention relates to an apparatus and method for a portable terminal having a dual Subscriber Identity Module (SIM) card.

2. Description of the Related Art

With the development of information communication techniques, functions of portable terminals have gradually been developed to satisfy various user demands. For example, a dual Subscriber Identity Module (SIM) phone has been developed so that a single portable terminal can use two phone numbers. A dual SIM phone has an advantage in that two network services can be simultaneously used by a single phone, and the portable terminals can be used with different phone numbers respectively for a personal usage and a business usage.

However, a conventional dual SIM phone has a problem in that, while a call is made to a phone number assigned to one SIM card, a user cannot make a call to a phone number assigned to the other SIM card. That is, while the user is making a call to a phone number assigned to one of two SIM cards, even if a call is requested to the phone number assigned to the other SIM card, there is no way to confirm the call request, which leads to a problem of missing the call.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for improving user convenience by providing a user-based call waiting function and call forwarding function adjusted to a dual Subscriber Identity Module (SIM) phone environment.

Another aspect of the present invention is to provide an apparatus and method for avoiding missing a call in an infinite loop situation due to an incorrect setting of a call forward function when a user sets the call forwarding function.

Another aspect of the present invention is to provide an apparatus and method for avoiding missing a call by providing a call waiting function and a call forwarding function between mutual SIMs when a user is out of a service area in a case where a dual SIM active function is set even if a SIM card placed in a dual SIM terminal is replaced with another card.

In accordance with an aspect of the present invention, a method of operating a portable terminal is provided. The method includes displaying a message regarding whether to set a dual SIM active function, selecting an area included in the message and confirming a setting of the dual SIM active function upon the selection of the area included in the message.

In an exemplary embodiment of the present invention, the dual SIM active function includes at least one of a call waiting function and an call forwarding function provided by the portable terminal capable of having two SIM cards.

In accordance with an aspect of the present invention, a portable terminal apparatus is provided. The portable apparatus includes an output unit for displaying a message regarding whether to set a dual SIM active function, an input unit for selecting an area included in the message and a controller for confirming a setting of the dual SIM active function upon the selection of the area included in the message.

In an exemplary embodiment of the present invention, at least two SIM cards inserted in the portable terminal apparatus are cards registered to a dual SIM active service in which the dual SIM active function can be set.

In an exemplary embodiment of the present invention, the controller confirms that two SIM cards are inserted in the portable terminal apparatus, and reads subscriber information included in the two SIM cards inserted in the portable terminal apparatus.

In an exemplary embodiment of the present invention, the subscriber information includes phone numbers respectively assigned to the two SIM cards inserted in the portable terminal apparatus.

In an exemplary embodiment of the present invention, the output unit displays another message regarding whether to set a call waiting function and a call forwarding function for each of SIM cards inserted in the portable terminal apparatus.

In an exemplary embodiment of the present invention, The portable apparatus further includes a storage unit for saving the set dual SIM active function.

In an exemplary embodiment of the present invention, if at least one of the two SIM cards inserted in the portable terminal apparatus is replaced with at least one different SIM card, the controller determines whether the dual SIM active function is set between a remaining at least one of the two SIM cards and the at least one different SIM card.

In an exemplary embodiment of the present invention, if it is determined that the dual SIM active function is set between the remaining at least one of the two SIM cards and the at least one different card, the controller reads a previously saved dual SIM active function.

In an exemplary embodiment of the present invention, if the controller determines that the dual SIM active function is not set between the remaining at least one of the two SIM cards and the at least one different SIM card, the output units displays the message regarding whether to set the dual SIM active function, a user selects the area included in the message through the input unit, the controller confirms that the at least one of the two SIM cards and the at least one different SIM card are inserted in the portable terminal apparatus, reads subscriber information included in the at least one of the two SIM cards and the at least one different SIM card, and confirms the setting of the dual SIM active function, and the apparatus further comprises a storage unit for saving the set dual SIM active function.

In an exemplary embodiment of the present invention, the dual SIM active function includes a call waiting function for holding a call while a phone number assigned to any one of SIM cards inserted in the portable terminal apparatus is busy.

In an exemplary embodiment of the present invention, the dual SIM active function includes an incoming call forwarding function for forwarding a call incoming to a phone number assigned to any one of two SIM cards placed in the portable terminal apparatus so that the call is made to a phone number assigned to the other SIM card when a the user of the portable terminal apparatus is out of a service area.

In an exemplary embodiment of the present invention, the incoming call forwarding function includes a function of displaying an error message upon manually selecting an always setting for the incoming call forwarding function or upon manually selecting a during call setting for the incoming call forwarding function among detailed manual selections of the incoming call forwarding function.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and configurations may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
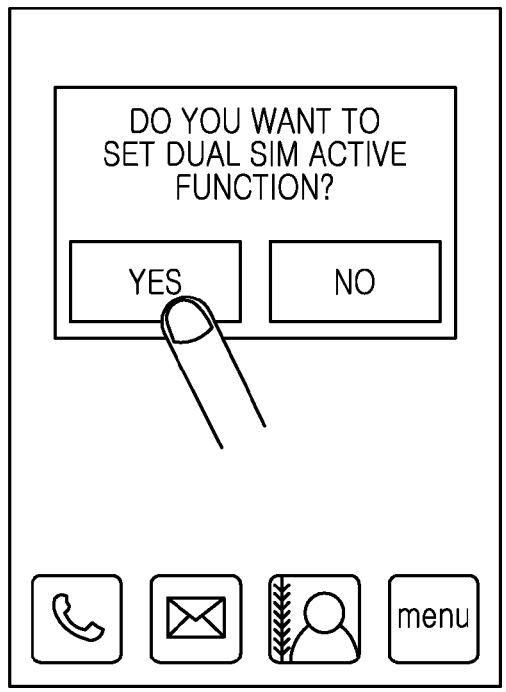
FIGS. 1A and 1B illustrate an example of encouraging a user to use a dual Subscriber Identity Module (SIM) active function in a portable terminal according to an exemplary embodiment of the present invention.
Figure 1B:
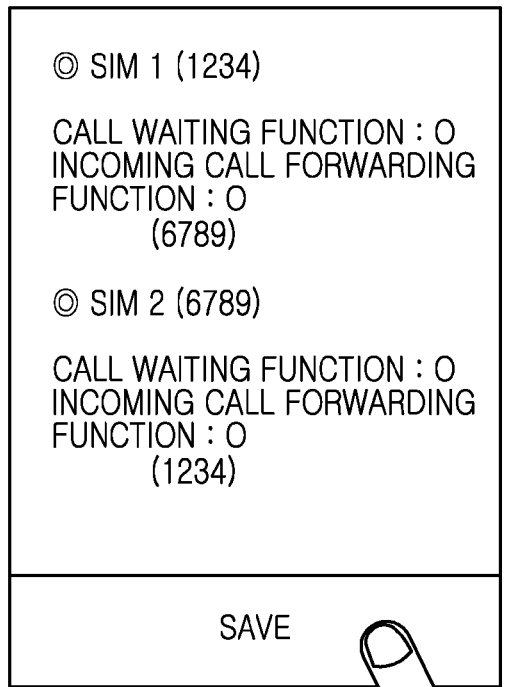

FIGS. 1A and 1B illustrate an example of encouraging a user to use a dual Subscriber Identity Module (SIM) active function in a portable terminal according to an exemplary embodiment of the present invention. First, a dual SIM phone implies a portable terminal that can have two SIM cards in one portable terminal. More specifically, one SIM card stores subscriber information including a phone number assigned to the card. That is, since one number is assigned to each SIM card, the dual SIM phone can have two SIM cards and the two phone numbers can be used by one phone.

For example, two network services can be simultaneously used by placing two SIM cards registered to different vendors in one portable terminal. In addition, a personal phone and a business phone can be separately used by placing two SIM cards registered as a personal phone number and a business phone number in one portable terminal.

Herein, the dual SIM active function is a function provided by the portable terminal capable of having two SIM cards. The dual SIM active function is defined as a function including a call waiting function, an incoming call forwarding function which forwards a call to a mutual SIM number stored in a dual SIM phone when the user is out of a service area, a dynamic call diverting function, and an avoiding infinite loop function. More specifically, the call waiting function is a function of holding a call when a phone number assigned to any one of the two SIM cards placed in the portable terminal is busy.

The call forwarding function is a function of forwarding a call incoming to any one of the two SIM cards placed in the portable terminal to a phone number assigned to the other SIM card to make the call possible. The dynamic call diverting function is a function of always maintaining a dual SIM active state regardless of which SIM is inserted in the dual SIM phone. The avoiding infinite loop function is defined as a function of preventing a dual SIM phone from missing a call due to an infinite loop. More specifically, the avoiding infinite loop function displays an error message in a case where the user is out of a service area and the incoming call forwarding function is selected in an overlapping manner with a manual for always setting the incoming call forwarding function between mutual SIMs or a manual for setting the function during a call among detailed manuals of the incoming call forwarding function.

FIG. 1A illustrates an example of displaying a message for setting a dual SIM active function in a portable terminal according to an exemplary embodiment. As illustrated in FIG. 1A, the portable terminal first displays whether to set the dual SIM active function in a display unit of the portable terminal.

Whenever the user inputs a command for setting the dual SIM active function, the portable terminal can automatically set the call waiting function and the call forwarding function, which forwards a call to a mutual SIM when a user is out of a service area, thereby improving user convenience. That is, when the user inputs the setting of the dual SIM active function, the portable terminal can automatically set the call waiting function and the call forwarding function.

More specifically, when the user inputs the setting of the dual SIM active function, the portable terminal can automatically read subscriber information included in the two SIM cards currently placed in the portable terminal, and can set the call waiting function and the call forwarding function.

FIG. 1B illustrates an example of displaying a setting of a dual SIM active function according to an exemplary embodiment. As illustrated in FIG. 1B, it is first assumed that a portable terminal can have a dual SIM card, and a phone number '1234' is assigned to one SIM card (i.e., SIM 1) between the two SIM cards placed in the portable terminal and a phone number '6789' is assigned to the other SIM card (i.e., SIM 2). Under such an assumption, for example, in order to encourage a user to easily set the dual SIM active function, the portable terminal displays a message on a display unit of the portable terminal as illustrated in FIG. 1A.

Thereafter, when the user receives a command for setting the dual SIM active function, the portable terminal displays details related to the dual SIM active function which is set as illustrated in FIG. 1B. More specifically, in the SIM 1 to which the phone number '1234' is assigned, the call waiting function is set, and the call forwarding function is also set so that a call incoming to the phone number '1234' assigned to the SIM 1 is forwarded to the phone number '6789' assigned to the SIM 2. In addition, in the SIM 2 to which the phone number '6789' is assigned, the call waiting function is set, and the call forwarding function is also set so that a call incoming to the phone number of '6789' assigned to the SIM 2 is forwarded to the phone number '1234' assigned to the SIM 1.

Herein, when the call forwarding function is automatically set, a corresponding SIM card is automatically set to "Out of service area" among detailed items of the call forwarding function. Detailed descriptions thereof will be described below with reference to FIG. 6. As described above, the exemplary embodiment provides a user-based dual SIM active function so that the user can easily set the call waiting function and the call forwarding function, thereby improving user convenience.

Figure 2C:
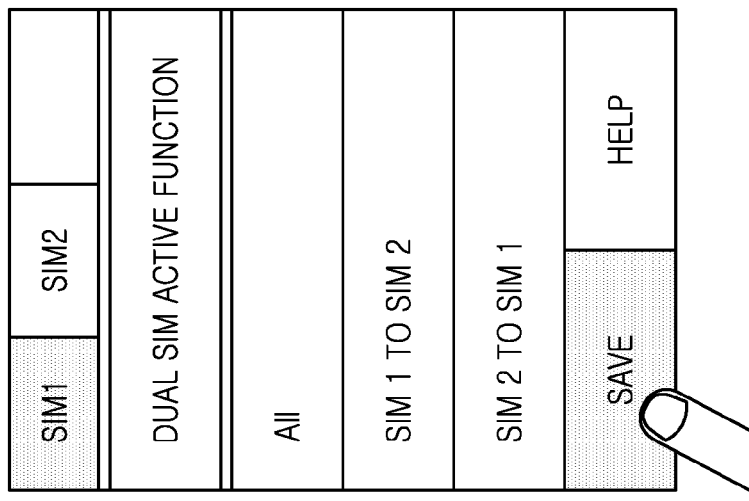
FIGS. 2A to 2C illustrate an example of setting a call forwarding function when a dual SIM active function is not automatically set according to an exemplary embodiment of the present invention.
Figure 2B:
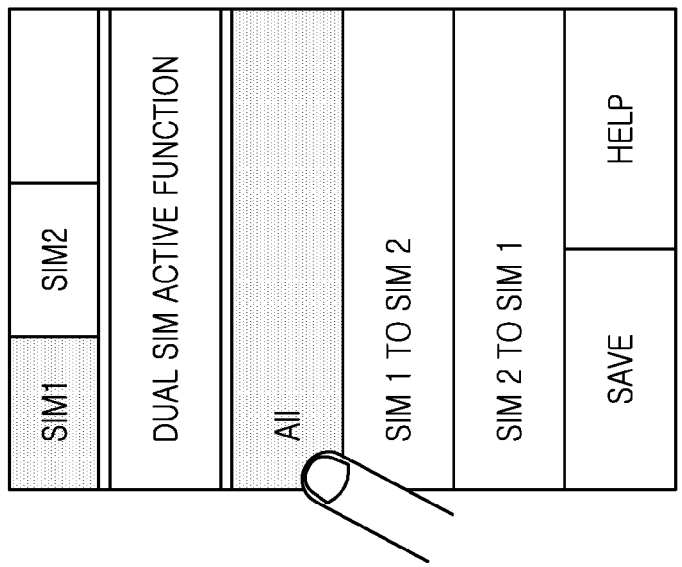
Figure 2A:
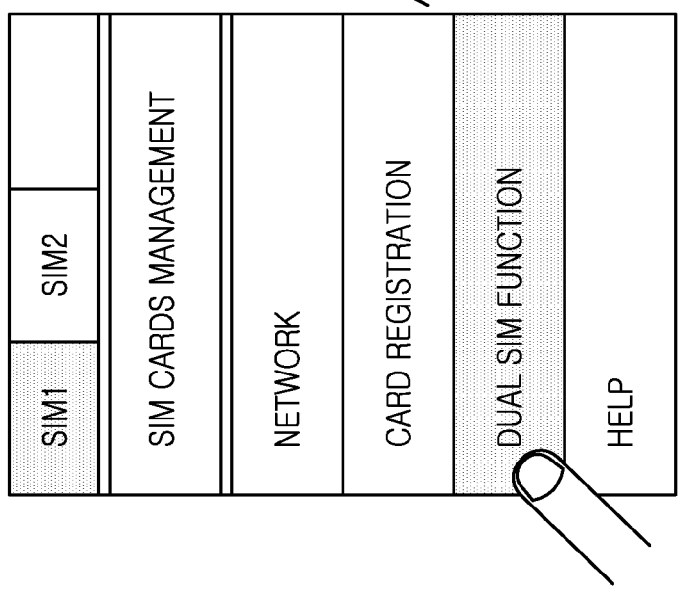

FIGS. 2A to 2C illustrate an example of setting a call forwarding function when a dual SIM active function is not automatically set according to an exemplary embodiment. As described in detail with reference to FIGS. 1A and 1B, the portable terminal of an exemplary embodiment can automatically set the dual SIM active function according to a user's selection. However, when a problem occurs in a network, or when there is a problem in that the portable terminal cannot read user information stored in the SIM card, or when the user desires to manually input the call forwarding function, the user can set the call forwarding function according to the example of FIGS. 2A to 2C.

In one example of manually setting the call forwarding function by the user according, when the user selects an area for managing a SIM card in a main screen of the portable terminal as illustrated in FIG. 2A, Network, Card Registration, Dual SIM Active Function, Help, etc., are displayed. Thereafter, the user selects the dual SIM active function to set the call forwarding function. Although not illustrated in FIGS. 2A to 2C, when the user selects the dual SIM active function, the call forwarding function and the call waiting function are displayed as detailed selection items.

Thereafter, when the user selects items indicating the call forwarding function to set the call forwarding function, a detailed item capable of selecting the call forwarding function of the dual SIM active function is displayed as illustrated in FIG. 2B.

FIG. 2B illustrates an example of setting the call forwarding function. As illustrated in FIG. 2B, the user can select an item 'All' capable of forwarding each call to two SIM cards placed in the portable terminal. Herein, the item 'All' of the dual SIM active function is a function including both a function of call forwarding from a SIM card 1 to a SIM card 2 (i.e., SIM 1 to SIM 2) and a function of call forwarding from the SIM card 2 to the SIM card 1 (i.e., SIM 2 to SIM 1). More specifically, in case of the function of call forwarding from the SIM 1 to the SIM 2, when a call is transmitted to a phone number assigned to the SIM 2 during a time when the phone number assigned to the SIM 1 is busy, the user can temporarily stop the call to the phone number assigned to the SIM 1 and can continue the call to the phone number assigned to the SIM 2 by using the phone number assigned to the SIM 1.

Likewise, in case of the function of call forwarding from the SIM 2 to the SIM 1, when a call is transmitted to the phone number assigned to the SIM 1 during the time the phone number assigned to the SIM 2 is busy, the user can temporarily stop the call to the phone number assigned to the SIM 2 and can continue the call to the phone number assigned to the SIM 1 by using the phone number assigned to the SIM 2. Therefore, optionally, the user can set only the function of call forwarding from the SIM 1 to the SIM 2, or can set only the function of call forwarding from the SIM 2 to the SIM 1. Further, as illustrated in FIG. 2B, by selecting the item 'All', the user can select both, the function of call forwarding from the SIM 1 to the SIM 2 and the function of call forwarding from the SIM 2 to the SIM 1.

FIG. 2C illustrates an example of saving the aforementioned process. When the user selects an item 'Save' as illustrated in FIG. 2C, the call forwarding function is manually set between two SIM cards placed in the portable terminal. As described in detail with reference to FIGS. 1A and 1B, an aspect of an exemplary embodiment is automatically setting the call forwarding function between mutual SIM cards in the dual SIM phone.

However, as described above, when a problem occurs in a network, or when there is a problem in that the portable terminal cannot read user information stored in the SIM card, a function of manually setting the call forwarding function is required.

In the conventional method, in order to set the call forwarding function, the user selects any one of the two SIM cards placed in the portable terminal, and individually inputs a phone number assigned to a SIM card to which a call is forwarded from the selected SIM card. For example, assume that the call forwarding function is set from the SIM 1 (to which the phone number '1234' is assigned) to the SIM 2 (to which the phone number '5678' is assigned). First, the user selects an item for setting a SIM card in a main screen of the portable terminal, and selects an item of the call forwarding function when a detailed item of setting the SIM card is displayed on the portable terminal.

Thereafter, when the user reselects an item of the function of call forwarding from the SIM 1 to the SIM 2, items for inputting the phone number assigned to the SIM 1 and the phone number assigned to the SIM 2 are respectively displayed on the portable terminal. When the items for inputting the respective numbers are displayed, the function of call forwarding from the SIM 1 to the SIM 2 can be set only when the user individually inputs the phone number '1234' assigned to the SIM 1 and the phone number '5678' assigned to the SIM 2. As described above, in order to input the conventional call forwarding function, the user has to individually and manually input detailed items. Therefore, the conventional method has many inconveniences, for example, a problem in that user convenience is low, a user who is unfamiliar with the portable terminal undergoes trial and error many times even if the user purchases the portable terminal having the two SIM cards, or the like.

In addition, there are cases when a user who desires to use the portable terminal capable of having a dual SIM, purchases two or more SIM cards so as to replace one of the two SIM cards with another or third SIM card. In this case, when a new or third SIM card is replaced in the portable terminal, there is a problem in that the user has to individually and manually set the call forwarding function again in the new card. However, in order to set the dual SIM active function according to an exemplary embodiment, as described in detail with reference to FIGS. 1A and 1B, the user-based call forwarding function can be provided to improve user convenience.

FIGS. 3A to 3D illustrate an example of setting a call waiting function when a dual SIM active function is not automatically set according to an exemplary embodiment. As described in detail with reference to FIGS. 1A and 1B, the portable terminal according to an exemplary embodiment can automatically set the dual SIM active function according to a user's selection. However, when a problem occurs in a network, or when there is a problem in that the portable terminal cannot read user information stored in the SIM card, or when the user desires to manually input the call forwarding function, the user can set the call waiting function according to the example illustrated in FIGS. 3A to 3D.

Figure 3A:
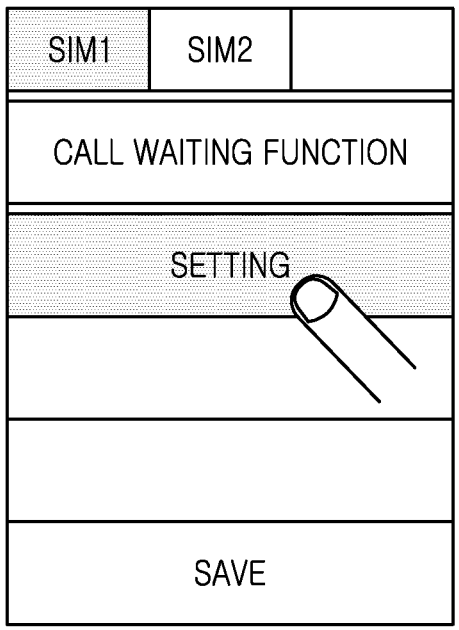
FIGS. 3A to 3D illustrate an example of setting a call waiting function when a dual SIM active function is not automatically set according to an exemplary embodiment of the present invention.

In one example of manually setting the call forwarding function by the user according to an exemplary embodiment, when the user selects an area for managing a SIM card in a main screen of the portable terminal, as illustrated in FIG. 2A, Network, Card Registration, Dual SIM Active Function, Help, etc., are displayed. Thereafter, the user selects the dual SIM active function to set the call waiting function. Although not illustrated in FIGS. 3A to 3D, when the user selects the dual SIM active function, the call forwarding function and the call waiting function are displayed as detailed selection items. Thereafter, when the user selects items indicating the call waiting function to set the call waiting function, a detailed item capable of selecting the call waiting function of the dual SIM active function is displayed as illustrated in FIG. 3A.

Figure 3B:
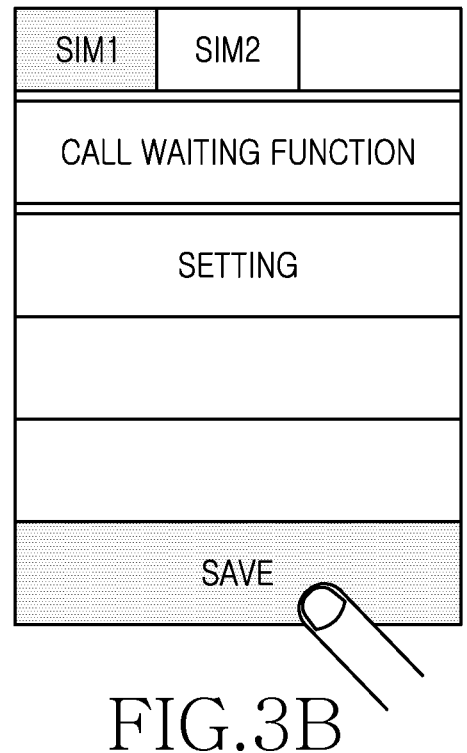
Figure 3C:
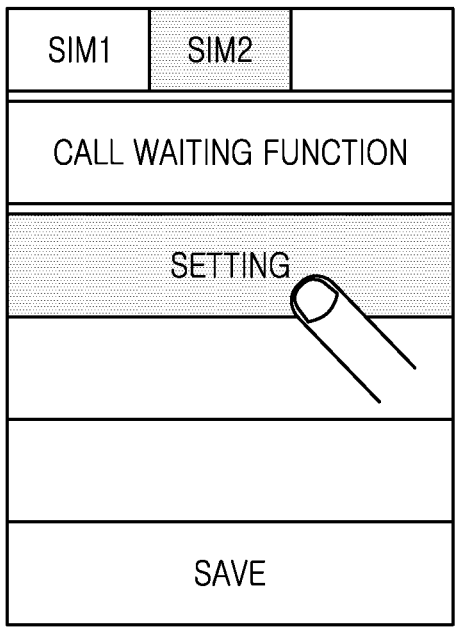
Figure 3D:
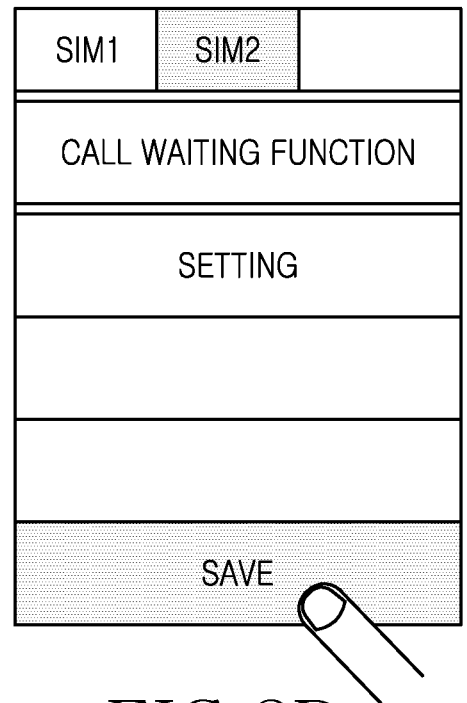

Thereafter, when the user selects an item for setting the call waiting function in the SIM 1 and selects an item for saving the call waiting function in the SIM 1 as illustrated in the example of FIG. 3B, the call waiting function is manually set in the SIM 1. Likewise, when the user selects the item for setting the call waiting function in the SIM 2 as illustrated in FIG. 3C and selects the item for saving the call waiting function in the SIM 2 as illustrated in the example of FIG. 3D, the call waiting function is manually set in the SIM 2. However, when a problem occurs in a network or when there is a problem in that the portable terminal cannot read user information stored in the SIM card, the call waiting function needs to be manually set.

In the conventional method, in order to set the call waiting function, the user selects any one of the two SIM cards placed in the portable terminal, and individually inputs a phone number assigned to a SIM card for which call waiting is required from the selected SIM card. For example, assume that the call waiting function is set in the SIM 1 (to which the phone number '1234' is assigned). First, the user selects an item for setting a SIM card in a main screen of the portable terminal, and selects an item of the call waiting function when a detailed item of setting the SIM card is displayed on the portable terminal.

Thereafter, when the user reselects an item for the call waiting function of the SIM 1, an item for inputting the phone number assigned to the SIM 1 is displayed on the portable terminal. When the item for inputting the phone number assigned to the SIM 1 is displayed on the portable terminal, the call waiting function of the SIM 1 can be set only when the user individually inputs the phone number '1234' assigned to the SIM 1. As described above, in order to input the phone number in the conventional call forwarding function, the user has to individually and manually input detailed items.

Therefore, the conventional method has many inconveniences, for example, the method is inconvenient, a user who is unfamiliar with the portable terminal must perform many operations to program the portable terminal even if the user purchases the portable terminal having the two SIM cards, or the like. In addition, the process in the convention method is more problematic in the case where a user who desires to use the portable terminal, purchases more SIM cards to replace the current SIM card with a new or third SIM card.

In this case, when a new SIM card is replaced in the portable terminal, there is a problem in that the user has to individually and manually set the call forwarding function again in the new card. However, in order to set the dual SIM active function according to an exemplary embodiment, as described in detail with reference to FIGS. 1A and 1B, the user-based call waiting function can be provided to improve user convenience.

Figure 4:
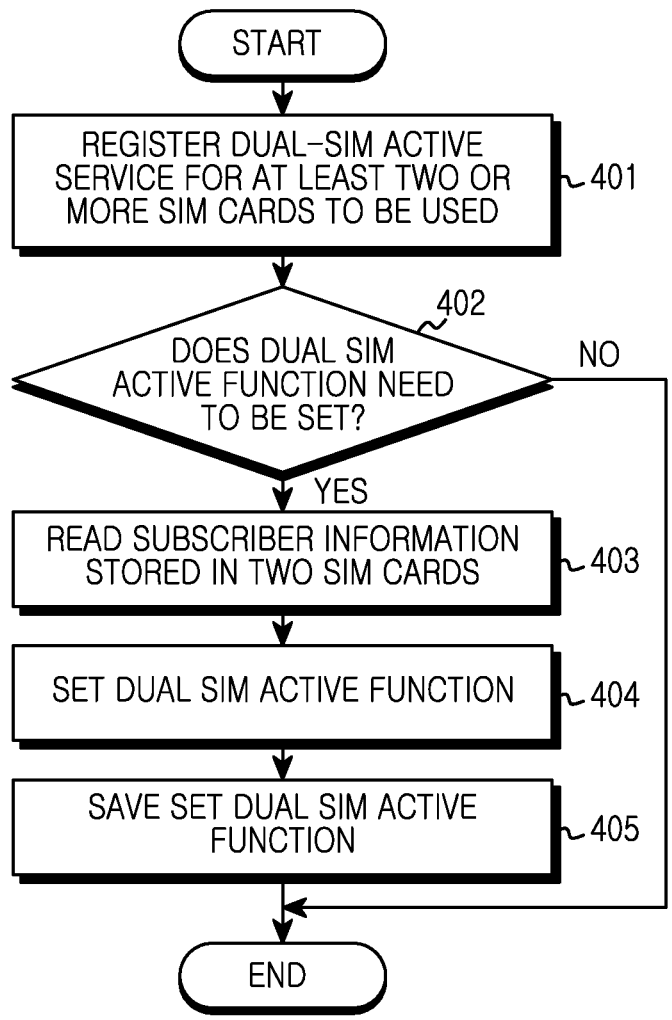
FIG. 4 is a flowchart illustrating a process of setting a dual SIM active function of a portable terminal according to an exemplary embodiment of the present invention.

FIG. 4 is a flowchart illustrating a process of setting a dual SIM active function of a portable terminal according to an exemplary embodiment. As illustrated in FIG. 4, in order to set the dual SIM active function, a dual SIM active service must be first registered to at least two SIM cards intended to be inserted into the portable terminal having the dual SIM active function in step 401. More specifically, the at least two SIM cards to be used by being inserted into the portable terminal must be registered for the dual SIM active service. That is, each card must be pre-registered so that a call number, a call forwarding function, and a call waiting function can be set.

Upon inserting the registered SIM card into the portable terminal, the portable terminal displays a message regarding whether to set the dual SIM active function in step 402. More specifically, the portable terminal displays a message regarding whether to set the dual SIM active function so that the user can easily set the dual SIM active function. Herein, the dual SIM active function is a function provided by a portable terminal capable of having two SIM cards, and is defined as a function including a call waiting function and an incoming call forwarding function.

The call waiting function is a function of holding a call when a phone number assigned to any one of the two SIM cards is busy between the two SIM cards placed in the portable terminal. The call forwarding function is a function of forwarding a call incoming to any one of the two SIM cards placed in the portable terminal to a phone number assigned to the other SIM card to make the call possible.

When a command for setting the dual SIM active function is input into the portable terminal, subscriber information stored in two SIM cards currently inserted into the portable terminal is read in step 403. More specifically, when the command for setting the dual SIM active function is input from the user, the portable terminal can automatically set the dual SIM active function by reading the subscriber information stored in the two SIM cards inserted to the portable terminal. In the conventional method, the user has to repeat many processes to set the call waiting function and the call forwarding function.

For example, the user has to individually input the call waiting function to each SIM card placed in the portable terminal by accessing a menu for managing the call waiting function and the call forwarding function. In addition, in order to set the call forwarding function, the user has to directly input and save a destination number to which a call is forwarded, by accessing a menu for one of the two SIM cards placed in the portable terminal. Further, the user has to directly input the call forwarding function to the other SIM card by repeating the aforementioned process. Furthermore, the aforementioned complex setting causes many inconveniences to a user who is unfamiliar with the operation of the portable terminal even if the user uses the portable function supporting the call waiting function and the call forwarding function.

However, the portable terminal of an exemplary embodiment displays a message regarding whether to set the dual SIM active function so that the user can easily set the dual SIM active function, and when the user inputs a command for setting the dual SIM active function, the portable terminal automatically sets the dual SIM active function by reading subscriber information stored in the two SIM cards inserted into the portable terminal, thereby improving user convenience.

Upon receiving the subscriber information stored in the two SIM cards, the portable terminal automatically sets the dual SIM active function in step 404. That is, when a setting of the dual SIM active function is input from the user, the portable terminal can automatically set the call waiting function and the call forwarding function. More specifically, upon receiving the setting of the dual SIM active function, the portable terminal automatically sets the call waiting function and the call forwarding function by reading the subscriber information included in the two SIM cards currently placed in the portable terminal.

Upon automatically setting the dual SIM active function, the portable terminal saves the set dual SIM active function in step 405.

In the conventional method, the call waiting function and the call forwarding function have to be manually set, and when the user replaces the current SIM card with another SIM card, the user has to set the call waiting function and the call forwarding function again after the replacement.

However, by saving the dual SIM active function which is once input to each SIM card, the portable terminal of an exemplary embodiment can set the dual SIM active function immediately by reading the saved information even if the current SIM card is replaced with another SIM card. In the aforementioned step 402, if the command for setting the dual SIM active function is not input by the user to the portable terminal, the process of setting the dual SIM active function stops immediately.

Figure 5:
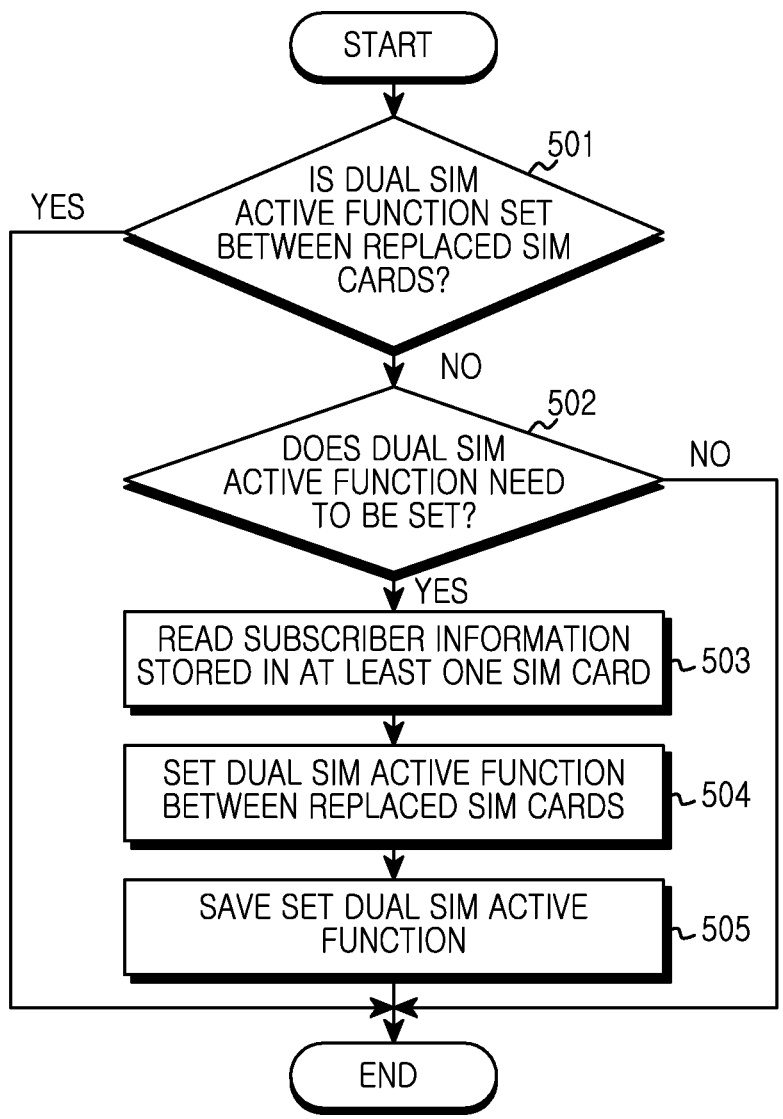
FIG. 5 is a flowchart illustrating a process of setting a dynamic call diverting function when a SIM card is replaced according to an exemplary embodiment of the present invention.

FIG. 5 is a flowchart illustrating a process of setting a dynamic call diverting function when a SIM card is replaced according to an exemplary embodiment. As illustrated in FIG. 5, the portable terminal determines whether the dual SIM active function is set between replaced SIM cards in step 501. Herein, the dynamic call diverting function is defined as a function of always maintaining a dual SIM active state even if any SIM is replaced and inserted in the dual SIM phone. That is, the dynamic call diverting function is a function of always maintaining a call waiting state even if a SIM is replaced and of forwarding a call between mutual SIMs so that when a call is made to one SIM in a dual SIM phone, a call incoming to another SIM is not missed.

That is, in the conventional method, the call waiting function and the call forwarding function have to be manually set, and when the user replaces the current SIM card with another SIM card, the user has to set the call waiting function and the call forwarding function again after the replacement.

However, by saving the dual SIM active function which is once input to each SIM card, as in the exemplary embodiment, the portable terminal of the exemplary embodiment can set the dual SIM active function immediately by reading the saved information even if the current SIM card is replaced with another SIM card.

If it is determined that the dual SIM active function is not set between the replaced SIM cards in the portable terminal, the portable terminal displays a message regarding whether to set the dual SIM active function in step 502. More specifically, the portable terminal displays a message regarding whether to set the dual SIM active function so that the user can easily set the dual SIM active function.

When a command for setting the dual SIM active function is input from the user to the portable terminal, the portable terminal reads subscriber information stored in at least one SIM card in step 503. More specifically, when the command for setting the dual SIM active function is input from the user, the portable terminal can automatically set the dual SIM active function by reading the subscriber information stored in the two SIM cards inserted to the portable terminal.

In the conventional method, the user has to repeat many processes to set the call waiting function and the call forwarding function. For example, the user has to individually input the call waiting function to each SIM card placed in the portable terminal by accessing a menu for managing the call waiting function and the call forwarding function. In addition, in order to set the call forwarding function, the user has to directly input and save a destination number to which a call is forwarded, by accessing a menu for one of the two SIM cards placed in the portable terminal.

Further, the user has to directly input the call forwarding function to the other SIM card by repeating the aforementioned process. Furthermore, the aforementioned complex setting causes many inconveniences to a user who is unfamiliar with the operation of the portable terminal even if the user uses the portable function supporting the call waiting function and the call forwarding function.

However, the portable terminal of an exemplary embodiment displays a message regarding whether to set the dual SIM active function so that the user can easily set the dual SIM active function, and when the user inputs a command for setting the dual SIM active function, the portable terminal automatically sets the dual SIM active function by reading subscriber information stored in the two SIM cards inserted to the portable terminal, thereby improving user convenience.

Upon reading the subscriber information stored in the SIM card newly inserted to the portable terminal, the portable terminal sets the dual SIM active function between the replaced SIM cards in step 504. That is, when a setting of the dual SIM active function is input from the user, the portable terminal can automatically set the call waiting function and the call forwarding function. More specifically, upon receiving the setting of the dual SIM active function, the portable terminal automatically sets the call waiting function and the call forwarding function by reading the subscriber information included in the two SIM cards currently placed in the portable terminal.

Upon automatically setting the dual SIM active function between the replaced SIM cards, the portable terminal saves the set dual SIM active function in step 505.

Meanwhile, in the conventional method, the call waiting function and the call forwarding function have to be manually set, and when the user replaces the current SIM card with another SIM card, the user has to set the call waiting function and the call forwarding function again after the replacement. However, by saving the dual SIM active function which is once input to each SIM card, the portable terminal of an exemplary embodiment can set the dual SIM active function immediately by reading the saved information even if the current SIM card is replaced with another SIM card.

In the aforementioned step 501, if the portable terminal determines that the dual SIM active function is set between the replaced SIM cards, the dual SIM active function between the replaced SIM cards stops without having to save the function. In addition, in the aforementioned step 502, if the command for setting the dual SIM active function is not input by the user to the portable terminal, the process of setting the dual SIM active function stops immediately.

Figure 6C:
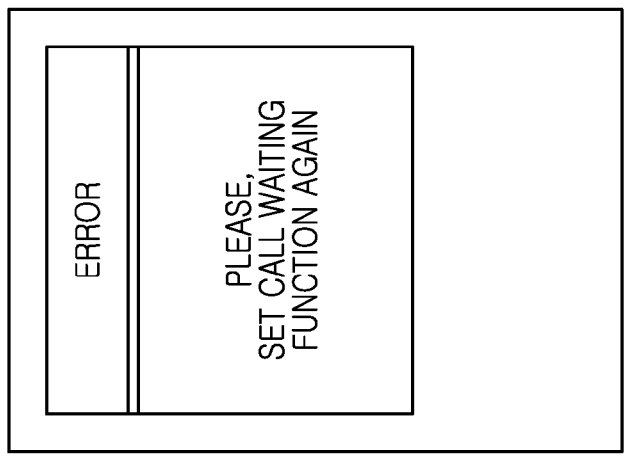
FIGS. 6A to 6C illustrate an example of an avoiding infinite loop function according to an exemplary embodiment of the present invention.
Figure 6B:
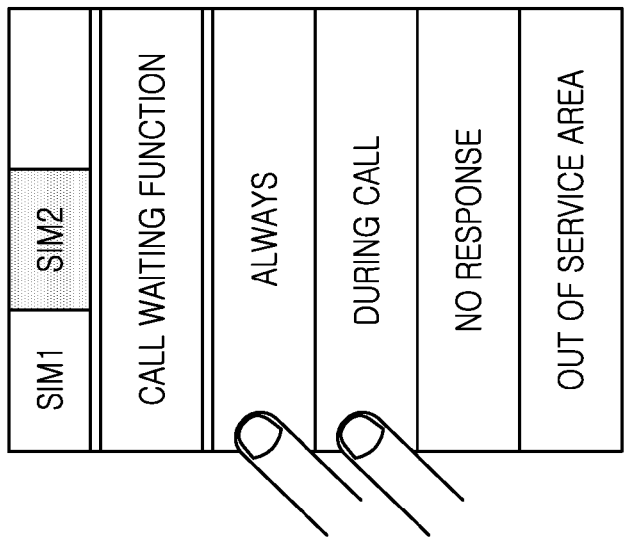
Figure 6A:
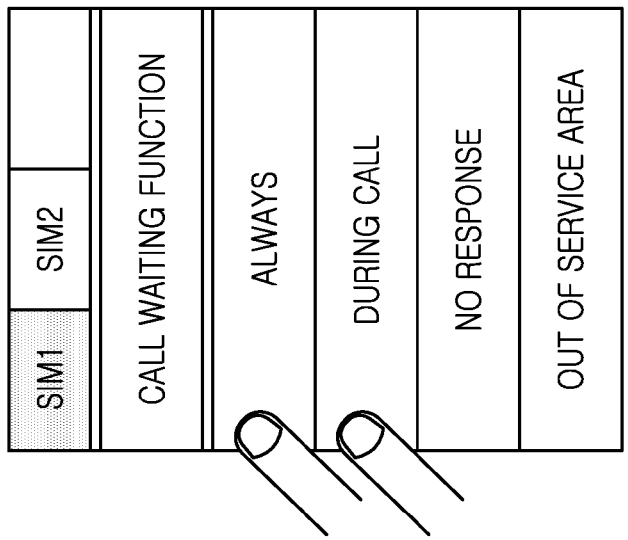

FIGS. 6A to 6C illustrate an example of avoiding an infinite loop function according to an exemplary embodiment. First, the avoiding infinite loop function is defined as a function of preventing a dual SIM phone from missing a call due to an infinite loop. More specifically, the avoiding infinite loop function displays an error message in a case where a user is out of a service area and the incoming call forwarding function is selected in an overlapping manner with a manual for always setting the incoming call forwarding function between mutual SIMs or a manual for setting the function during a call among detailed manuals of the incoming call forwarding function.

As illustrated in FIG. 6A and FIG. 6B, when the user selects the call waiting function to manually set the call forwarding function, a detailed manual of the call waiting function is displayed on a display unit of the portable terminal. The detailed manual may be a manual for setting the call forwarding function always, during a call, where there is no response, when the user is out of the service area, etc. Herein, if the call forwarding function for forwarding a call to the mutual SIM when the user is out of the service area is selected in an overlapping manner with the manual for setting the call forwarding function always or during a call, then the portable terminal may miss the call due to the infinite loop.

For example, it is assumed that, when the user sets the call forwarding function in the SIM 1, the call forwarding function is set to a phone number assigned to the SIM 2 "always" when an incoming call is requested to a phone number assigned to the SIM 1. Thereafter, when the incoming call is requested to the phone number assigned to the SIM 1 in the portable terminal while the phone number assigned to the SIM 2 is busy, the portable terminal confirms the call forwarding function currently set in the SIM 1. That is, in the aforementioned example, the portable terminal confirms whether the call forwarding function of the SIM 1 is set such that the call forwarding function is "always" set to the phone number assigned to the SIM 2.

Thereafter, the portable terminal forwards the call, which is requested for the phone number assigned to the SIM 1, to the phone number of the SIM 2. However, since a call is currently made to the SIM 2 to which the call is forwarded from the SIM 1, the call is forwarded again to the SIM 1, which results in an infinite loop.

However, in an exemplary embodiment, when the user manually inputs the call forwarding function, if the user selects a manual for always setting the call forwarding function or a manual for setting the call forwarding function during a call, the portable terminal displays an error message and thus can prevent the user from a situation of the aforementioned infinite loop. In FIG. 6C, as an example of an infinite loop avoidance function according to an exemplary embodiment, when the user manually inputs the call forwarding function, if the user selects the manual for always setting the call forwarding function or the manual for setting the call forwarding function during a call, an error message is immediately displayed on a display unit of the portable terminal. Therefore, since the dual SIM active function of an exemplary embodiment includes the infinite loop avoidance function, there is an advantage in that user convenience is improved.

Figure 7:
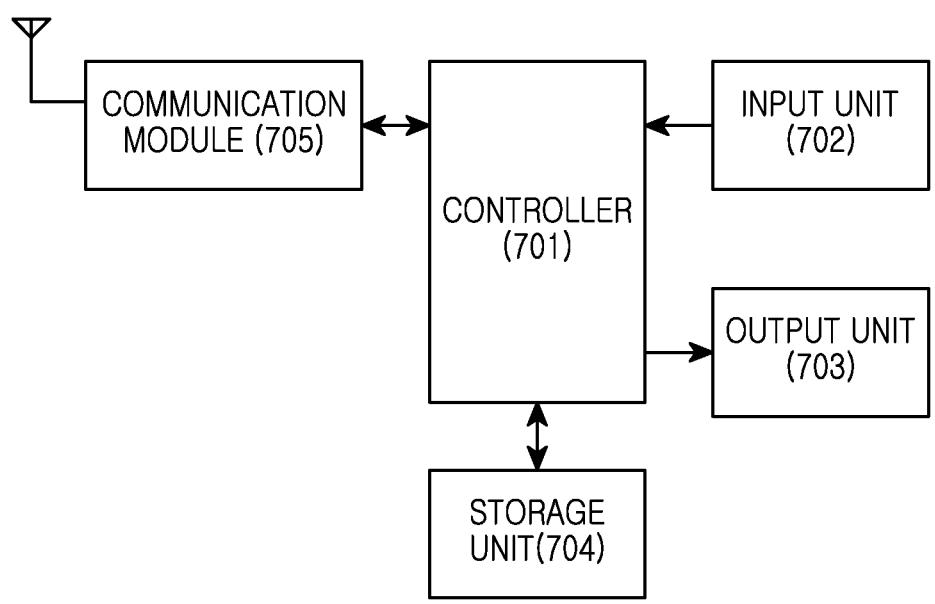
FIG. 7 is a block diagram illustrating a structure of a portable terminal according to an exemplary embodiment of the present invention.

FIG. 7 is a block diagram illustrating a structure of a portable terminal according to an exemplary embodiment. Referring to FIG. 7, the portable terminal includes a controller 701, an input unit 702, an output unit 703, a storage unit 704, and a communication module 705.

The controller 701 provides overall control to the portable terminal. For example, the controller 701 confirms a setting of a dual SIM active function, confirms that two SIM cards are placed in the portable terminal, and reads subscriber information included in the two SIM cards. In addition, if at least one of the two SIM cards placed in the portable terminal is replaced with at least one different card, the controller 701 determines whether the dual SIM active function is set between the replaced two or less cards.

In addition, if it is determined the dual SIM active function is set between the replaced two or less cards, the controller 701 reads the saved dual SIM active function. In addition, the controller 701 confirms the two SIM cards placed in the portable terminal, reads subscriber information included in the two SIM cards, and confirms the setting of the dual SIM active function.

The input unit 702 provides the controller 701 with input data generated by a user's selection. For example, the input unit 702 receives the user's selection on any area or on a specific area included in a message displayed on the input unit 702.

The output unit 703 displays terminal's status information, a menu screen, and story information under the control of the controller 701. For example, the output unit 703 displays a message regarding whether to set the dual SIM active function, and displays whether to set a call waiting function and a call forwarding function in each SIM placed in the portable terminal. In addition, the output unit 703 displays a message regarding whether to set the dual SIM active function.

A touch sensitive display, called as a touch screen, may be used as input unit 702 and the output unit 703. In this situation, a touch input may be performed via the touch sensitive display.

The storage unit 704 may include a program storage unit for storing a program for controlling an operation of the portable terminal and a data storage unit for storing data generated while the program is executed. For example, the storage unit 704 stores the determined dual SIM active function and the determined information.

The communication module 705 processes a signal which is transmitted and received through an antenna for voice and data communication.

In the aforementioned structure, the controller 701 can perform overall functions of the portable terminal. However, these functions are separately configured and illustrated in the exemplary embodiment to describe the respective functions separately. Therefore, when the product is implemented in practice, all functions of the portable terminal may be processed by the controller 701 or only some of the functions of the portable terminals may be processed by the controller 701.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing an apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of operating a portable terminal having a dual subscriber identity module (SIM) card, the method comprising:
    displaying a message regarding whether to set a dual SIM active function;
    selecting an area included in the message; and
    confirming a setting of the dual SIM active function upon the selection of the area included in the message,
    wherein the dual SIM active function includes a call waiting function and a call forwarding function to forward an incoming call to any assigned phone number as provided by the portable terminal capable of having two SIM cards, and
    wherein the confirming of the setting of the dual SIM active function comprises displaying another message regarding whether to set the call waiting function and the call forwarding function for each of the two SIM cards inserted in the portable terminal.

2. The method of claim 1, wherein at least two SIM cards inserted in the portable terminal are cards registered to a dual SIM active service in which the dual SIM active function can be set.

3. The method of claim 1, further comprising:
    confirming that the two SIM cards are inserted in the portable terminal; and
    reading subscriber information included in each of the two SIM cards inserted in the portable terminal.

4. The method of claim 3, wherein the subscriber information included in each of the two SIM cards inserted in the portable terminal includes a phone number respectively assigned to each of the two SIM cards inserted in the portable terminal.

5. The method of claim 1, further comprising saving the set dual SIM active function.

6. The method of claim 1, further comprising, if at least one of two SIM cards inserted in the portable terminal is replaced with at least one different SIM card, determining whether the dual SIM active function is set between a remaining at least one of the two SIM cards and the at least one different SIM card.

7. The method of claim 6, further comprising, if it is determined that the dual SIM active function is set between the remaining at least one of the two SIM cards and the at least one different SIM card, reading a previously saved dual SIM active function.

8. The method of claim 6, further comprising, if it is determined that the dual SIM active function is not set between the remaining at least one of the two SIM cards and the at least one different SIM card:
    displaying another message regarding whether to set the dual SIM active function;
    selecting the area included in the other message;
    confirming that the remaining at least one of the two SIM cards and the at least one different SIM card are inserted in the portable terminal;
    reading subscriber information included in the remaining at least one of the two SIM cards and the at least one different SIM card;
    confirming the setting of the dual SIM active function; and
    saving the set dual SIM active function.

9. The method of claim 1, wherein the dual SIM active function includes the call waiting function for holding a call while a phone number assigned to any one of SIM cards placed in the portable terminal is busy.

10. The method of claim 1, wherein the dual SIM active function includes an incoming call forwarding function for forwarding a call incoming to a phone number assigned to any one of SIM cards placed in the portable terminal so that the call is made to a phone number assigned to another of the SIM cards when a user of the portable terminal is out of a service area.

11. The method of claim 10, wherein the incoming call forwarding function includes a function of displaying an error message upon manually selecting an always setting for the incoming call forwarding function or upon manually selecting a during call setting for the incoming call forwarding function among detailed manual selections of the incoming call forwarding function.

12. A portable terminal apparatus having a dual subscriber identity module (SIM) card, the portable terminal apparatus comprising:
    an output unit configured to display a message regarding whether to set a dual SIM active function;
    an input unit configured to select an area included in the message; and
    a controller configured to confirm a setting of the dual SIM active function upon the selection of the area included in the message,
    wherein the dual SIM active function includes of a call waiting function and a call forwarding function to forward an incoming call to any assigned phone number as provided by the portable terminal apparatus capable of having two SIM cards, and wherein the output unit is further configured to display another message regarding whether to set the call waiting function and the call forwarding function for each of the two SIM cards inserted in the portable terminal apparatus.

13. The portable terminal apparatus of claim 12, wherein at least two SIM cards inserted in the portable terminal apparatus are cards registered to a dual SIM active service in which the dual SIM active function can be set.

14. The portable terminal apparatus of claim 12, wherein the controller is further configured to confirm that the two SIM cards are inserted in the portable terminal apparatus, and to read subscriber information included in each of the two SIM cards inserted in the portable terminal apparatus.

15. The portable terminal apparatus of claim 14, wherein the subscriber information included in each of the two SIM cards inserted in the portable terminal apparatus includes a phone number respectively assigned to each of the two SIM cards inserted in the portable terminal apparatus.

16. The portable terminal apparatus of claim 12, further comprising a storage unit configured to save the set dual SIM active function.

17. The portable terminal apparatus of claim 12, wherein, if at least one of two SIM cards inserted in the portable terminal apparatus is replaced with at least one different SIM card, the controller is further configured to determine whether the dual SIM active function is set between a remaining at least one of the two SIM cards and the at least one different SIM card.

18. The portable terminal apparatus of claim 17, wherein, if it is determined that the dual SIM active function is set between the remaining at least one of the two SIM cards and the at least one different card, the controller is further configured to read a previously saved dual SIM active function.

19. The portable terminal apparatus of claim 17, wherein, if the controller determines that the dual SIM active function is not set between the remaining at least one of the two SIM cards and the at least one different SIM card, the output unit is further configured to display another message regarding whether to set the dual SIM active function, a user selects the area included in the other message through the input unit, the controller is further configured to confirm that the remaining at least one of the two SIM cards and the at least one different SIM card are inserted in the portable terminal apparatus, subscriber information included in the remaining at least one of the two SIM cards and the at least one different SIM card is read, the setting of the dual SIM active function is confirmed, and the portable terminal apparatus further comprises a storage unit configured to save the set dual SIM active function.

20. The portable terminal apparatus of claim 12, wherein the dual SIM active function includes the call waiting function for holding a call while a phone number assigned to any one of SIM cards inserted in the portable terminal apparatus is busy.

21. The portable terminal apparatus of claim 12, wherein the dual SIM active function includes an incoming call forwarding function for forwarding a call incoming to a phone number assigned to any one of SIM cards placed in the portable terminal apparatus so that the call is made to a phone number assigned to another of the SIM cards when a user of the portable terminal apparatus is out of a service area.

22. The portable terminal apparatus of claim 21, wherein the incoming call forwarding function includes a function of displaying an error message upon manually selecting an always setting for the incoming call forwarding function or upon manually selecting a during call setting for the incoming call forwarding function among detailed manual selections of the incoming call forwarding function.

23. A method of operating a dual subscriber identity module (SIM) phone, the method comprising:
displaying a message on the phone regarding whether to set a dual SIM active function;
selecting an area included in the displayed message;
confirming a setting of the dual SIM active function upon the selection of the area included in the message;
automatically reading subscriber information included in at least one SIM card inserted in the phone and setting a call waiting function and a call forwarding function for the phone; and
saving the setting of the dual SIM active function,
wherein the dual SIM active function includes the call waiting function and the call forwarding function to forward an incoming call to any assigned phone number as provided by the phone capable of having two SIM cards, and
wherein the confirming of the setting of the dual SIM active function comprises displaying another message regarding whether to set the call waiting function and the call forwarding function for each of the two SIM cards inserted in the phone.

* * * * *